United States Patent
Cao et al.

[11] Patent Number: 5,933,260
[45] Date of Patent: Aug. 3, 1999

[54] METHOD AND SYSTEM FOR WAVELENGTH DIVISION MULTIPLEXER

[75] Inventors: Xiaofan Cao, San Mateo; Yu Zheng, Sunnyvale, both of Calif.

[73] Assignee: Oplink Communications, Inc., San Jose, Calif.

[21] Appl. No.: 08/846,027

[22] Filed: Apr. 25, 1997

[51] Int. Cl.[6] .................................................. H04J 14/02
[52] U.S. Cl. ............................................. 359/124; 359/131
[58] Field of Search ........................... 359/124, 176–127, 359/131, 161; 385/24, 31

[56] References Cited

U.S. PATENT DOCUMENTS 5,629,995  5/1997  Duck et al. ............................. 359/131
5,642,448  6/1997  Pan et al. ................................. 385/31
5,796,889  8/1998  Xu et al. ................................. 359/124

*Primary Examiner*—Kinfe-Michael Negash
*Attorney, Agent, or Firm*—Sawyer & Associates

[57] ABSTRACT

A system and method for separating a component signal having a predetermined wavelength from a signal carried over a range of wavelengths is disclosed. The system comprises a first filter for transmitting light of the predetermined wavelength. The component signal is reflected rather than transmitted. The system further comprises a second filter for transmitting light of a second predetermined wavelength. The second filter is in the transmission direction from the first filter. Thus, the component signal is separated by transmission by the first filter and reflection from the second filter.

8 Claims, 4 Drawing Sheets

METHOD AND SYSTEM FOR WAVELENGTH DIVISION MULTIPLEXER

FIELD OF THE INVENTION

The present invention relates to a method and system for providing a wavelength division multiplexer and more particularly to a method and system for narrowing the blocking band without significant narrowing of the pass band or increasing insertion losses.

BACKGROUND OF THE INVENTION

It is desirable to transmit a large number of signals using fiber optic technology. However, it is extremely expensive and time consuming to provide a larger number of cables between transmitters and receivers. Thus, in order to transmit a large number of signals with existing hardware, a plurality of signals must be carried on each cable.

In order to transmit a large number of signals on a given cable, signals carried on a plurality wavelengths are multiplexed together for transmission. After the multiplexed signal reaches the destination, the signals are demultiplexed, in order to access the information carried on a single wavelength. Conventional wavelength division demultiplexer are used to separate the signal into individual wavelengths.

Conventional wavelength division multiplexers utilize a pair of filters in order to achieve high isolation which pass light in a range around a single wavelength to separate the signal into its component signals. The range of wavelengths transmitted by a filter is the pass band. Referring to FIG. 1, the pass band 11 is a narrow portion of the wavelength. Each of the component signals, centered a single wavelength, is known as a channel. However, each channel actually exists over a range of wavelengths.

As of number of channels increases, the channels must be placed closer together in order to carry the signals in the same total wavelength range. However, as the channels are placed closer together, the blocking bands begin to overlap. To remedy this, conventional systems pass each channel through at least two filters in series. Thus, the pass band is narrowed sufficiently to allow individual channels to be deconvoluted.

Although the conventional systems can separate signals on individual channels, those with ordinary skill in the art will realize that conventional systems also result in higher insertion loss. Each filter has a transmission loss associated with it. Consequently, the plurality of filters cause additional insertion loss. In addition, because a filter narrows the entire channel transmitted by the filter, the pass band is narrowed. Because the pass band is narrowed, the laser providing the signal for the channel must provide light within the narrower pass band. Consequently, a more accurate laser is also required.

Accordingly, what is needed is a system and method for providing a wavelength division multiplexer which has lower insertion loss and requires a less accurate laser. The present invention addresses such a need.

SUMMARY OF THE INVENTION

The present invention provides a method and system for separating a component signal having a predetermined wavelength from a signal carried over a range of wavelengths. The system comprises a first filter for transmitting light of the predetermined wavelength. The component signal is transmitted by the first filter and has a transmission direction. The system further comprises a second filter for transmitting light of a second predetermined wavelength. The second filter is in the transmission direction from the first filter. The component signal is reflected by the second filter.

According to the system and method disclosed herein, the present invention can separate a plurality of signals carried on a plurality of wavelengths with lower insertion loss. The insertion loss for the component signal is lowered because the reflection loss is smaller than transmission loss. In addition, because the second filter reflects the component signal the pass band is not significantly narrowed. Thus, a laser producing light over a larger range of wavelengths can be used as the source of the signal. Overall system performance is thereby increased.

DETAILED DESCRIPTION OF THE INVENTION

The present invention relates to an improvement in separating signals carried at a plurality of wavelengths, for example in a wavelength division demultiplexer. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 2:
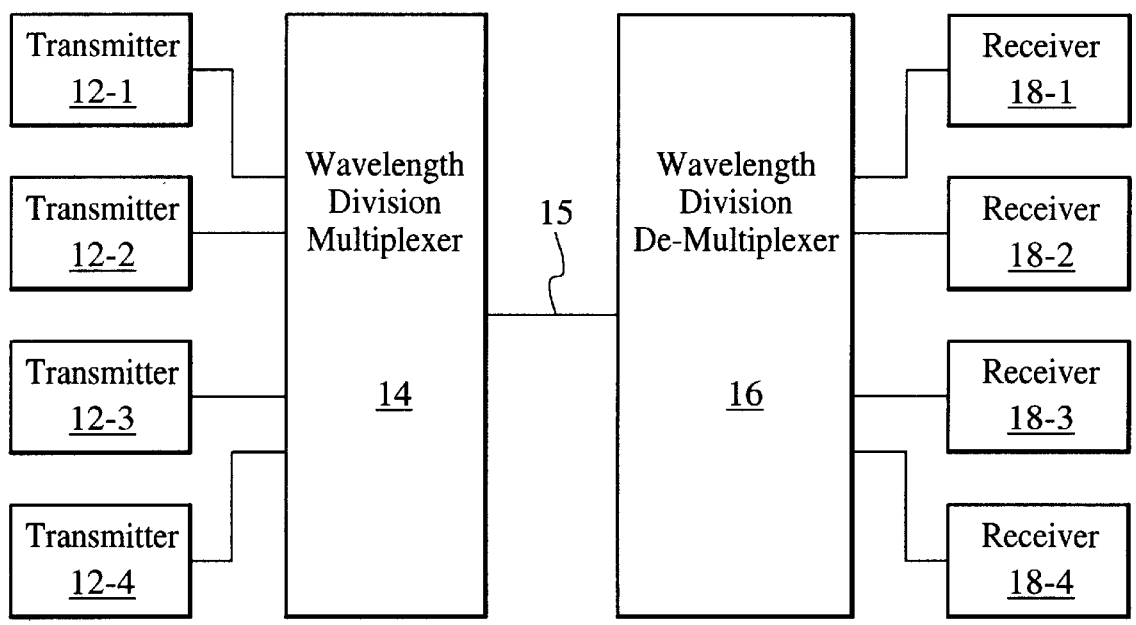
FIG. 2 is a block diagram of a system utilizing a wavelength division multiplexer and a wavelength division demultiplexer.

FIG. 2 is a block diagram of a system 10 using a wavelength division multiplexer 14 and demultiplexer 16. A plurality of transmitters, 12-1 through 12-4, each transmit signals at a different wavelengths. Each transmitter 12-1 through 12-4 could be a laser. The wavelength division multiplexer 14 multiplexes the signals to a single signal carried over a fiber 15. The wavelengths demultiplexer 16 separates the multiplexed signal into the component signals. The component signals are received by receivers 18-1 through 18-4. Although the system 10 is shown having only four transmitters 12-1 through 12-4, four receivers 18-1 through 18-4, and one cable 15, nothing prevents the system 10 from having a different number of transmitters, receivers, or cables.

Figure 1:
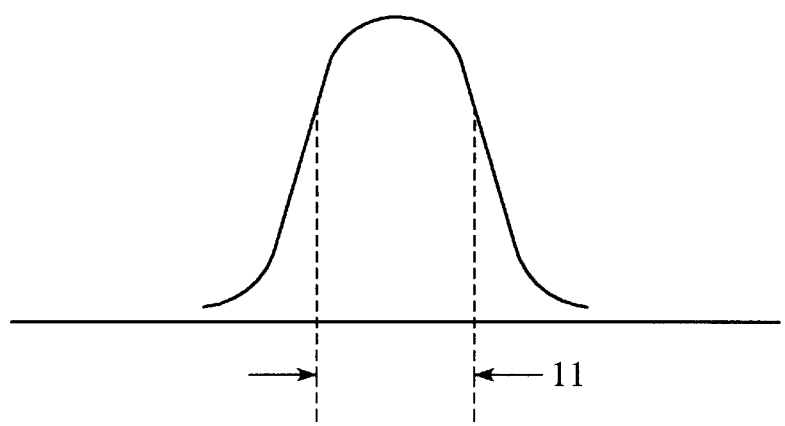
FIG. 1 is a diagram illustrating the pass band of a frequency.
Figure 3:
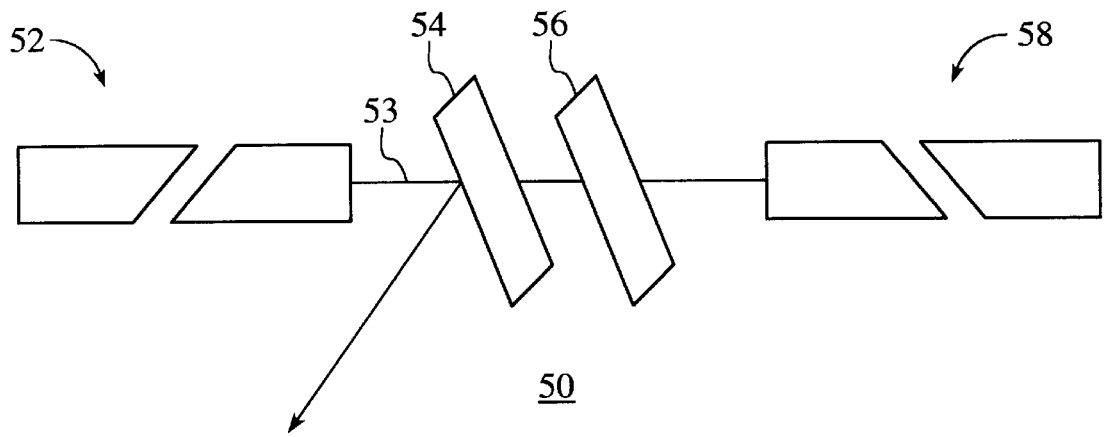
FIG. 3 is a is a block diagram depicting a conventional wavelength division demultiplexer.

FIG. 3 is a block diagram of a conventional system 50 for separating a signal comprised of a plurality of component into the component signals. Such a system 50 could be used in demultiplexer 16 of FIG. 1. Referring back to FIG. 3, the signal enters through collimator 52. In order to separate out a component signal at a particular wavelength, two filters, 54 and 56, are used. The wavelengths of the light passed by filters 54 and 56 can be tuned by changing the angle of each filter 54 and 56 with the light from the collimator 53. The component signal passed by filters 54 and 56 is then transmitted to the collimator 58. The remaining signal is reflected off filter 54 and travels to another collimator (not shown). Other component signals may be isolated by successive pairs of filters, not shown.

The filters 54 and 56 which pass light in a range around a single wavelength to separate the signal into its component signals. This range of wavelengths transmitted with little loss in intensity is the pass band. Each of the component signals, centered around a single wavelength, is actually carried on a range of wavelengths. This range of wavelengths is typically known as a channel.

To carry a larger number of signals, more channels must be used. As of number of channels increases, the channels must be placed closer together. However, as the channels are placed closer together, the blocking bands begin to overlap. To remedy this, conventional systems pass each channel through at least two filters in series. Thus, the pass band is narrowed sufficiently to allow individual channels to be deconvoluted.

Although the conventional system 50 can separate signals on individual channels, those with ordinary skill in the art will realize that conventional systems also result in higher insertion loss. Because each filter has a transmission loss associated with it, the filters 54 and 56 increase the insertion loss of the system 50. In addition, because the entire channel is narrowed by transmission through either filter 54 and 56, the pass band is narrowed. Because the pass band is narrowed, the laser providing the signal for the channel must provide light within the narrower pass band. Consequently, a more accurate laser is also required.

The present invention provides for a method and system for separating a signal into its component channels while having a lower insertion loss. In addition, a less accurate laser is required. The present invention will be described in terms of a system in a wavelength division demultiplexer. However, one of ordinary skill in the art will readily recognize that this method and system will operate effectively for other types of lasers and other systems in which the wavelength of light must be monitored or controlled.

Figure 4:
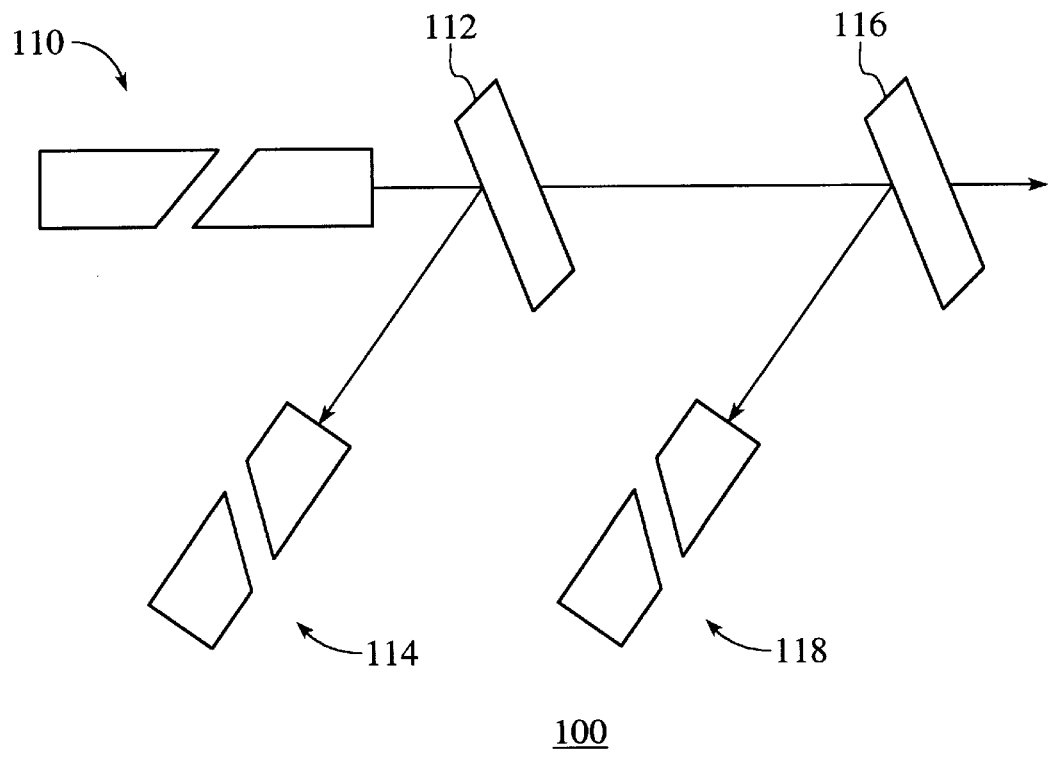
FIG. 4 is a block diagram with an embodiment of a method and system for separating a plurality of signals into their component wavelengths in accordance with the method and system.

To more particularly illustrate the system and method in accordance with the present invention, refer now to FIG. 4 depicting a block diagram of one embodiment 100 of such a system. The signal enters through the collimator 10. A first filter 12 is then used to pass light of a predetermined wavelength. The first filter can be tuned by varying the angle of incidence of the signal from the collimator 10. Because of nonidealities in the filter, some light having other wavelengths is also transmitted. All other wavelengths are reflected, traveling to collimator 114.

The light passing through filter 112 then travels to a second filter 116. The second filter can be tuned by varying the angle of incidence of the light traveling from the first filter 112. The second filter passes light having a wavelength other than the predetermined wavelength. The component signal, the channel at the predetermined wavelength, is reflected off filter 116 and travels to collimator 118. The component signal can then be transferred, for example, to a receiver 18 of FIG. 1.

Because the second filter 116 reflects light rather than transmitting it, the loss is smaller. Consequently, the insertion loss for each channel is lower. In addition, because the component signal is comprised of light transmitted by the first filter 112 and reflected by the second filter 116, the blocking band of the component signal is narrowed without significantly narrowing the pass band. This aspect of the system 100 is shown in FIGS. 5a and 5b.

Figure 5A:
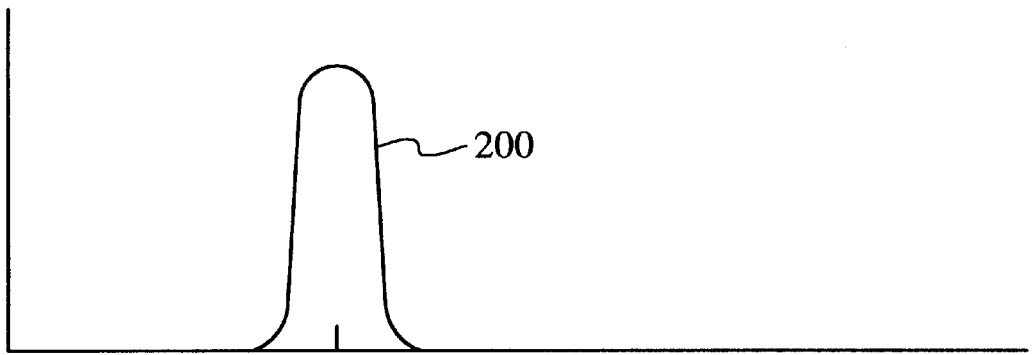
FIG. 5a depicts the transmission spectrum for a filter of FIG. 3.
Figure 5B:
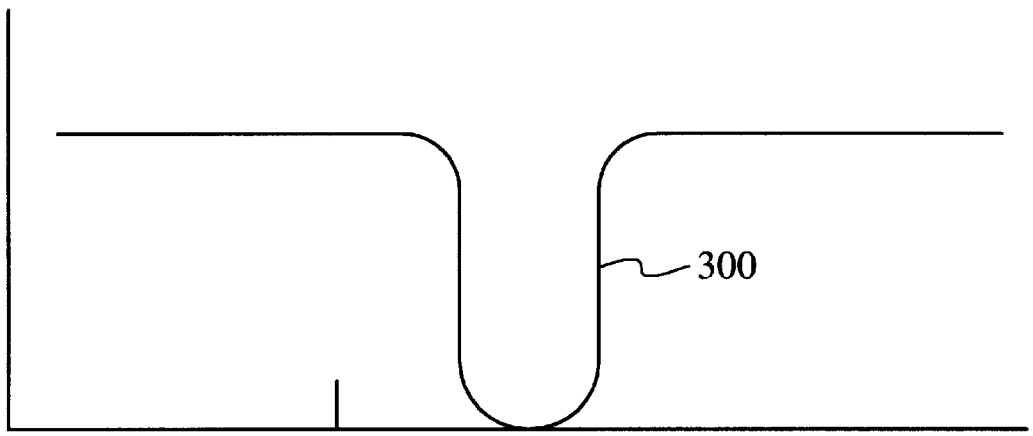
FIG. 5b depicts the reflection spectrum of a filter of FIG. 3.
Figure 5C:
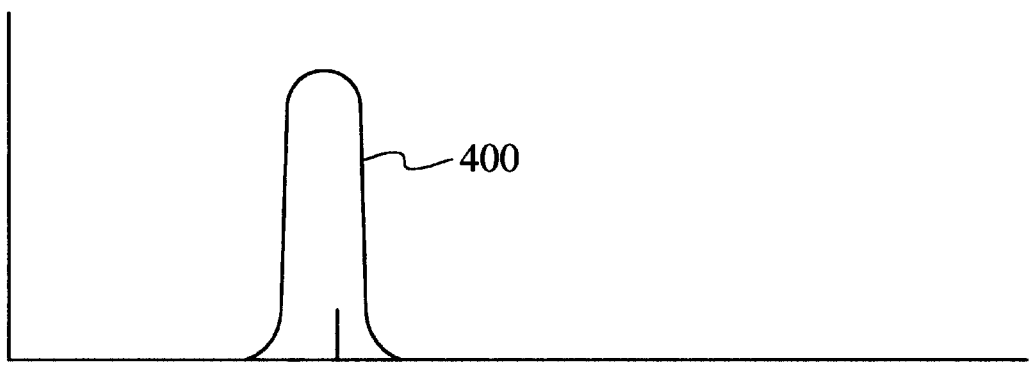
FIG. 5c depicts the spectrum of the component signal isolated by the system.

FIG. 5a depicts the transmission spectrum 200 for the first filter 112 of FIG. 4. FIG. 4b depicts the reflection spectrum 300 of the second filter 116 of FIG. 3. FIG. 5c depicts the spectrum 400 of the component signal isolated by the system 100. This spectrum 400 is a combination of the spectra in FIG. 4a and 4b. Because the second filter 116 reflects the component signal, the pass band of the component signal is not significantly narrowed by the second filter. Because of this, a less accurate laser can be used to generate the light comprising the component signal and allow the component signal to be successfully isolated by the system 100.

Figure 6:
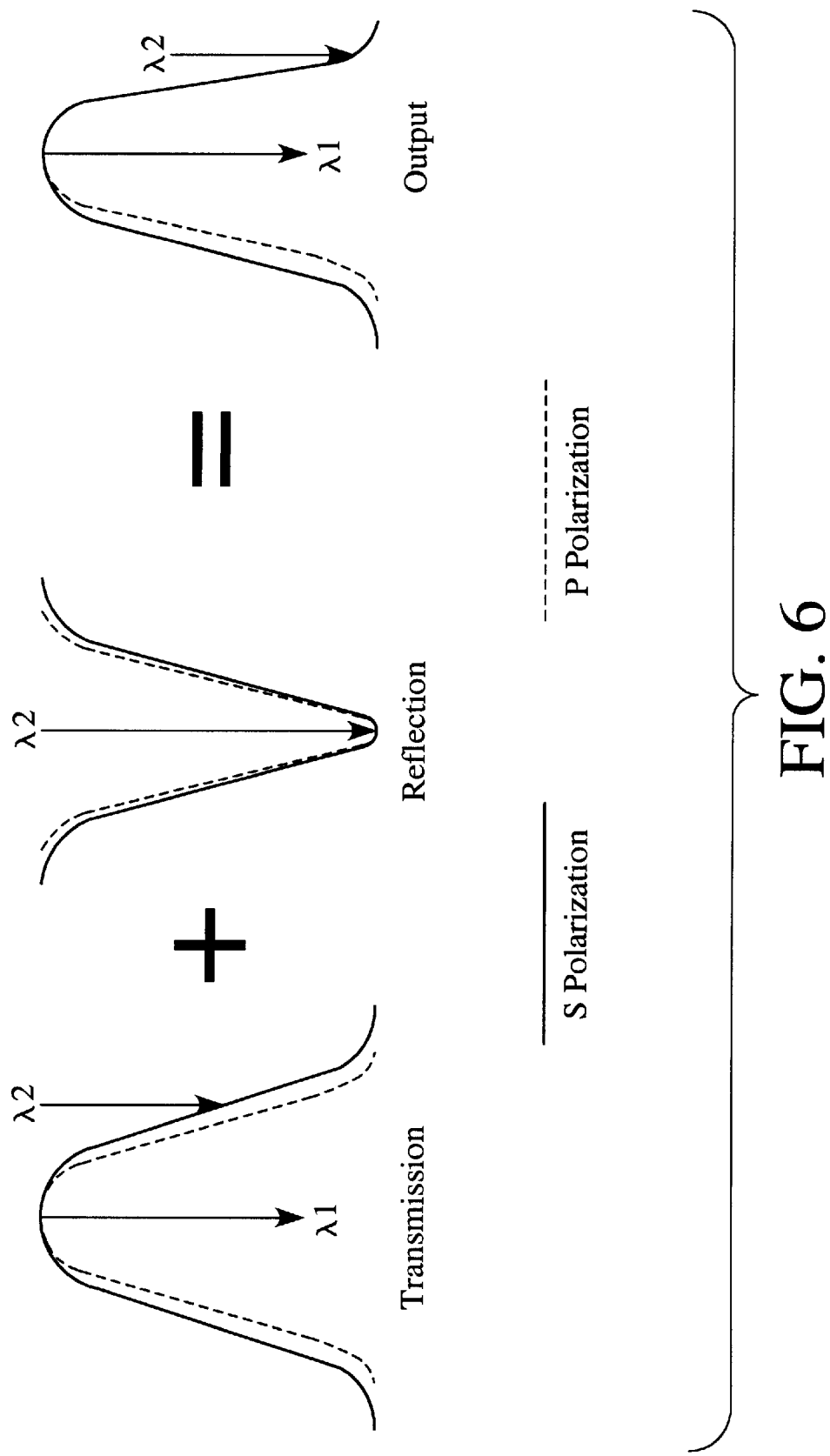
FIG. 6 depicts the output of compensated polarization dependent loss.

To more fully explain this feature, refer now to FIG. 6. FIG. 6 illustrates the output of compensated polarization dependent loss. As is seen in the transmission case the polarization dependent loss (PDL) that is the difference between a first polarization (S polarization 502) and a second polarization (CP polarization 503) is positive in transmission. On the other hand, the PDL for reflection is negative. Therefore, the output of the combination is compensated and therefore at a reduced level.

A method and system has been disclosed for isolating a component signal having a particular wavelength from a signal having a plurality of wavelengths. According to the method and system, the insertion loss for the component signal is lowered. In addition, the pass band is not significantly narrowed, allowing a less accurate laser to be used for generating the component signal.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for separating a component signal having a predetermined wavelength from a signal carried over a range of wavelengths comprising:

a first filter for transmitting light of the predetermined wavelength, the component signal being transmitted by the first filter and having a transmission direction; and a second filter for transmitting light of a second predetermined wavelength, the second filter being in the transmission direction from the first filter, the component signal being reflected by the second filter;

wherein the component signal is separated by transmission by the first filter and reflection by the second filter.

2. The system of claim 1 further comprising a collimator coupled to the first filter for collimating the signal.

3. The system of claim 2 further comprising a second collimator coupled to the second filter for collimating the component signal.

4. The system of claim 3 further comprising a laser coupled to the collimator for providing the component signal.

5. A method for separating a component signal having a predetermined wavelength from a signal carried over a range of wavelengths comprising:
  (a) providing a first filter for transmitting light of the predetermined wavelength, the component signal being transmitted by the first filter and having a transmission direction; and
  (b) providing a second filter for transmitting light of a second predetermined wavelength, the second filter being in the transmission direction from the first filter, the component signal being reflected by the second filter;

wherein the component signal is separated by transmission by the first filter and reflection by the second filter.

6. The method of claim 5 further comprising the step of:
  (d) providing a first collimator coupled to the first filter for collimating the component signal.

7. The method of claim 6 further comprising the step of:
  (e) providing a second collimator coupled to the second filter for collimating the component signal.

8. The method of claim 7 further comprising the step of:
  (e) providing a laser coupled to the collimator for providing the component signal.

* * * * *